(12) United States Patent
Zourob et al.

(10) Patent No.: US 12,449,932 B2
(45) Date of Patent: Oct. 21, 2025

(54) METHOD AND APPARATUS FOR PERFORMING PARTIAL READS OF A TOUCH SENSOR

(71) Applicant: Telefonaktiebolaget LM Ericsson (publ), Stockholm (SE)

(72) Inventors: Mohammed Zourob, London (CA); Alexander Hunt, Tygelsjö (SE); Andreas Kristensson, Södra Sandby (SE); Mohammed Abdulaziz, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/684,134

(22) PCT Filed: Aug. 31, 2021

(86) PCT No.: PCT/EP2021/074043
§ 371 (c)(1),
(2) Date: Feb. 15, 2024

(87) PCT Pub. No.: WO2023/030613
PCT Pub. Date: Mar. 9, 2023

(65) Prior Publication Data
US 2024/0353954 A1    Oct. 24, 2024

(51) Int. Cl.
*G06F 3/041* (2006.01)
(52) U.S. Cl.
CPC .................. *G06F 3/04166* (2019.05)
(58) Field of Classification Search
CPC ............... G06F 1/3262; G06F 3/04166; G06F 3/041661; G06F 3/0446
See application file for complete search history.

(56) References Cited

U.S. PATENT DOCUMENTS 8,022,317 B2    9/2011    Ely
2011/0175835 A1    7/2011    Wang
(Continued)

FOREIGN PATENT DOCUMENTS

| EP | 2372504 A2 | 10/2011 |
|---|---|---|
| KR | 101582597 B1 | 1/2016 |
| KR | 102081809 B1 | 2/2020 |

OTHER PUBLICATIONS

An, Jae-Sung, et al., "A 3.9-KHz Frame Rate and 61.0-dB SNR Analog Front-End IC With 6-bit Pressure and Tilt Angle Expressions of Active Stylus Using Multiple-Frequency Driving Method for Capacitive Touch Screen Panels", IEEE Journal of Solid-State Circuits, vol. 53, No. 1, Jan. 2018, 17 pages.

*Primary Examiner* — Chun-Nan Lin
(74) *Attorney, Agent, or Firm* — Murphy, Bilak & Homiller, PLLC

(57) ABSTRACT

A technique for performing partial reads of a touch sensor (10) provides several advantages, including scalability to touch sensors with high sensing-line counts, and reductions in operating power. The technique involves identifying a region (46) of the touch surface (12) of the touch sensor (10) to be read and performing a partial read directed to the identified region. Rather than exciting all sensing lines of the touch surface (12), the partial read excites one or more of the sensing lines (18, 28) that are involved with the identified region (46), without exciting one or more of the uninvolved sensing lines (18, 28). Identifying the region or regions (46) to be read involves, for example, obtaining touch-control information from a software application (74) running on a host device (72) that includes the touch sensor (10).

13 Claims, 8 Drawing Sheets

(56) References Cited

U.S. PATENT DOCUMENTS

| | | |
|---|---|---|
| 2012/0075205 A1 | 3/2012 | Huang et al. |
| 2013/0176270 A1 | 7/2013 | Cattivelli et al. |
| 2015/0035768 A1 | 2/2015 | Shahparnia et al. |
| 2015/0091858 A1 | 4/2015 | Rosenberg et al. |
| 2015/0091859 A1 | 4/2015 | Rosenberg et al. |
| 2015/0309610 A1 | 10/2015 | Rabii et al. |
| 2016/0162011 A1 | 6/2016 | Verma et al. |
| 2016/0195990 A1* | 7/2016 | Han ................... G06F 1/3262 345/173 |
| 2016/0259467 A1 | 9/2016 | Nayyar et al. |
| 2016/0378251 A1 | 12/2016 | Aznoe |
| 2017/0199022 A1 | 7/2017 | Anderson et al. |
| 2017/0199626 A1 | 7/2017 | D'Souza |
| 2017/0344174 A1 | 11/2017 | Pant et al. |
| 2018/0307376 A1* | 10/2018 | Citta ................... H03K 17/962 |
| 2018/0329563 A1 | 11/2018 | Han et al. |
| 2019/0050102 A1 | 2/2019 | Johnson et al. |
| 2019/0138148 A1 | 5/2019 | Kwon |
| 2020/0050320 A1 | 2/2020 | Yang et al. |
| 2020/0326795 A1 | 10/2020 | Chang et al. |
| 2021/0191562 A1 | 6/2021 | Han |
| 2022/0075485 A1* | 3/2022 | Citta ................... H03K 17/962 |

* cited by examiner

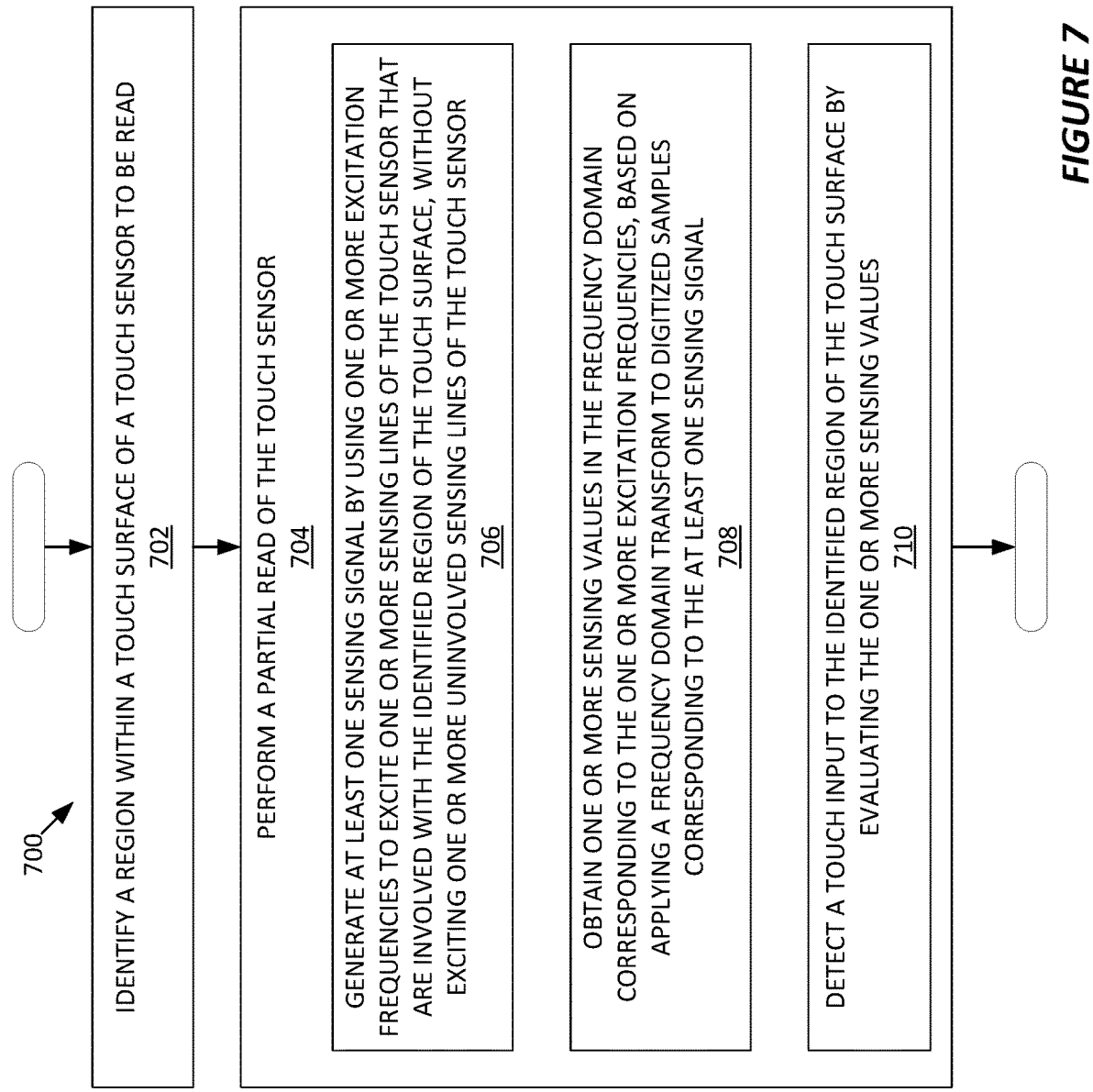

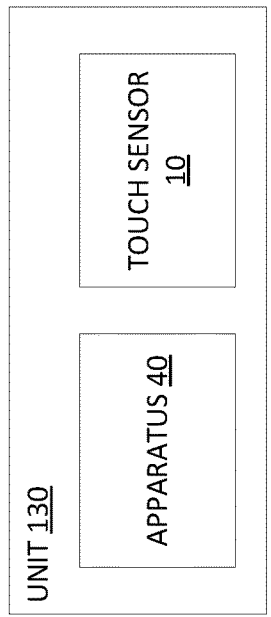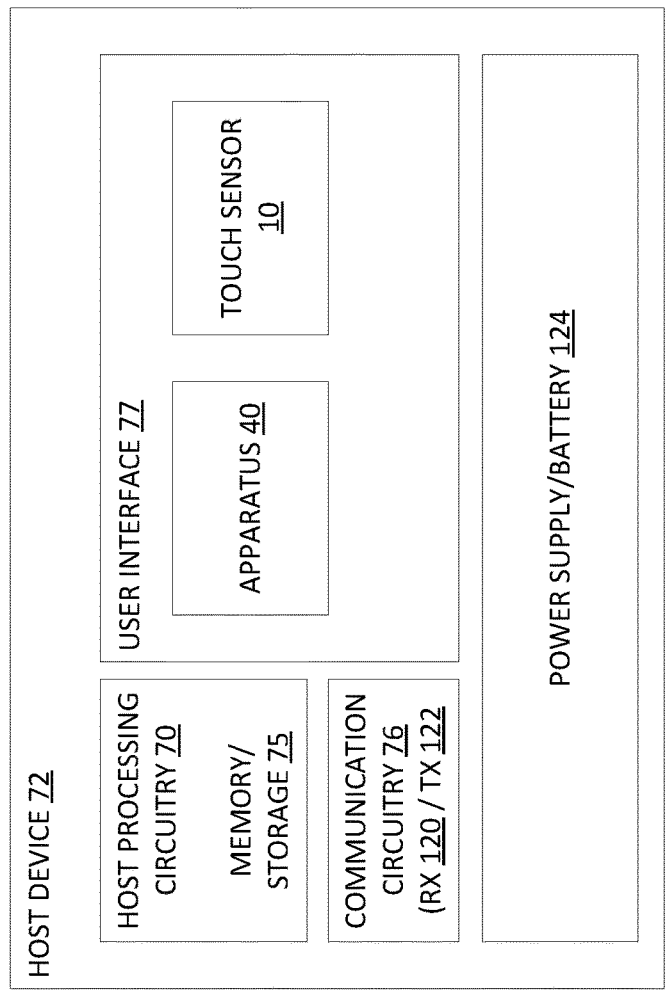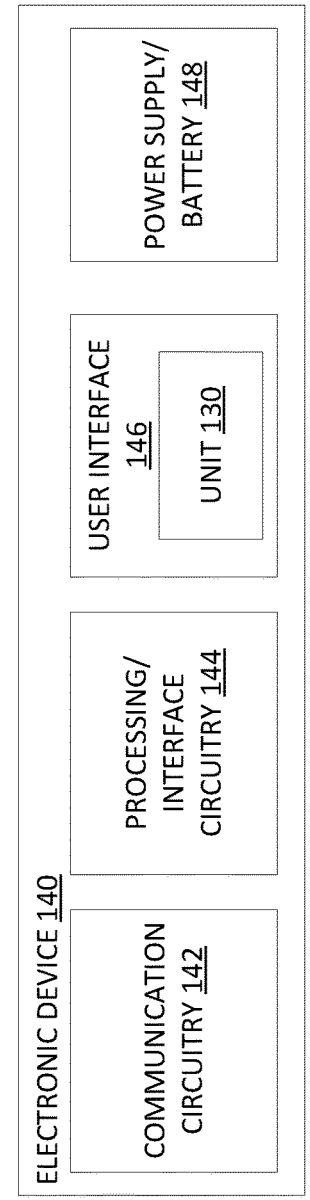

METHOD AND APPARATUS FOR PERFORMING PARTIAL READS OF A TOUCH SENSOR

TECHNICAL FIELD

The invention relates to touch sensors and particularly relates to interfacing with touch sensors.

BACKGROUND

Touch sensors find widespread use, in everything from laptops and other personal computing devices, such as smartphones and tablets, to banking terminals, point-of-sale terminals, etc. Interfacing with touch sensors imposes several challenges, such as balancing the amount and complexity of the interface circuitry against performance and cost. Among other things, "performance" refers to the time required for reading the touch sensor to determine whether or where the touch surface of the touch sensor is being touched, as well as the power consumption associated with detecting touch inputs.

An example arrangement involving capacitive touch sensor technology includes a capacitive touchscreen comprising a substrate with an X-Y grid of capacitors formed thereon or therein and arranged as intersecting screen columns and screen rows. A touch input to the touch surface alters the capacitance of the underlying or proximate capacitors, which alters the voltage of an analog excitation signal applied to the affected columns/rows. Reading touch sensors of the capacitive type, and of other types, may be accomplished by simultaneously applying excitation signals to the full set of screen columns using column-specific frequencies and doing likewise for the full set of rows, to obtain a combined column signal and a combined row signal which are digitized and transformed into the frequency domain for touch-input evaluation. See PCT/EP2020/086794, for example details regarding such operations.

SUMMARY

Methods and apparatus embody a technique for reading a touch sensor that provides several advantages, including scalability to touch sensors with high sensing-line counts, and reductions in operating power. The technique involves identifying a region of the touch surface of the touch sensor to be read and performing a partial read directed to the identified region. Rather than exciting all sensing lines of the touch surface, the partial read excites one or more of the sensing lines that are involved with the identified region, without exciting one or more of the uninvolved sensing lines. Identifying the region or regions to be read involves, for example, obtaining touch-control information from a software application running on a host device that includes the touch sensor.

One embodiment comprises a method of reading a touch sensor, where the method includes identifying a region within a touch surface of the touch sensor to be read, and performing, as a partial read of the touch sensor, a transform-based read of the identified region. Performing the transform-based read includes generating at least one sensing signal by using one or more excitation frequencies to excite one or more sensing lines of the touch sensor that are involved with the identified region of the touch surface, without exciting one or more uninvolved sensing lines of the touch sensor. Further operations include obtaining one or more sensing values in the frequency domain corresponding to the one or more excitation frequencies, based on applying a frequency domain transform to digitized samples corresponding to the at least one sensing signal, and detecting a touch input to the identified region of the touch surface by evaluating the one or more sensing values.

Another embodiment comprises an apparatus that is configured for reading a touch sensor. The apparatus includes processing circuitry and further includes or is associated with reading circuitry. The reading circuitry is configured to apply selected excitation frequencies to selected sensing lines of the touch sensor, to generate corresponding sensing signals for detecting touch inputs to a touch surface of the touch sensor. The processing circuitry is configured to identify a region within the touch surface of the touch sensor to be read and perform a partial read of the touch sensor.

The processing circuitry performs the partial read based on being configured to control the reading circuitry to generate at least one sensing signal by using one or more excitation frequencies to excite one or more sensing lines of the touch sensor that are involved with the identified region of the touch surface, without exciting one or more uninvolved sensing lines of the touch sensor. Further, for performing the partial read, the processing circuitry is configured to obtain one or more sensing values in the frequency domain corresponding to the one or more excitation frequencies, based on applying a frequency domain transform to digitized samples corresponding to the at least one sensing signal, and detect a touch input to the identified region of the touch surface by evaluating the one or more sensing values.

Another embodiment comprises a method of reading a region within the touch surface to be read as an aggregated touch region. Reading a region of the touch surface as an aggregated touch region means detecting the presence or absence of touch input within the region without using separate excitation frequencies for the involved sensing lines. For example, any row-oriented sensing lines that are excited for the read are excited with the same excitation frequency; likewise, any column-oriented sensing lines that are excited for the read are excited with the same excitation frequency. Hence, the resulting frequency-domain sensing value(s) reflect the presence or absence of a touch input somewhere within the aggregated touch region, without resolving where the touch input occurred within the aggregated touch region.

Such operations offer the opportunity to reduce the power needed to perform the read, simplify frequency-domain processing, and may offer improved touch responsiveness. Of course, the method may include performing both partial readings of identified regions of a touch surface, e.g., at full resolution or reduced resolution, and aggregated touch region readings. The two types of readings may be performed at the same time with respect to different, non-conflicting regions of the touch surface, or may be performed at different times, e.g., in different modes or with respect to different types of touch control in use by software applications that receive touch inputs via the involved touch sensor.

A corresponding embodiment comprises an apparatus configured to read an area within the touch surface of a touch sensor as an aggregated touch area. For example, the apparatus is configured to use a same excitation frequency for the row-oriented sensing line(s) that is/are excited for the read; likewise, the apparatus is configured to use a same excitation frequency for the column-oriented sensing line(s) that is/are excited for the read. Hence, the apparatus is configured to detect the presence or absence of a touch input somewhere within the aggregated touch area, without resolving the particular location of the touch input within the aggregated touch area. Of course, an apparatus in one embodiment may be configured to perform partial reads of identified regions of the touch surface, e.g., at full resolution or reduced resolution within the identified region, and, at the same time or at other times, perform aggregated touch area readings.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 7 is a logic flow diagram of a method of reading a touch sensor, according to one embodiment.

FIG. 10 is a block diagram of a host device, according to an embodiment.

FIG. 11 is a block diagram of a unit comprising a touch sensor and an apparatus for reading the touch sensor, according to one embodiment.

FIG. 12 is a block diagram of a mobile communication device according to one embodiment, wherein the device includes the unit of FIG. 11.

DETAILED DESCRIPTION

Figure 2:
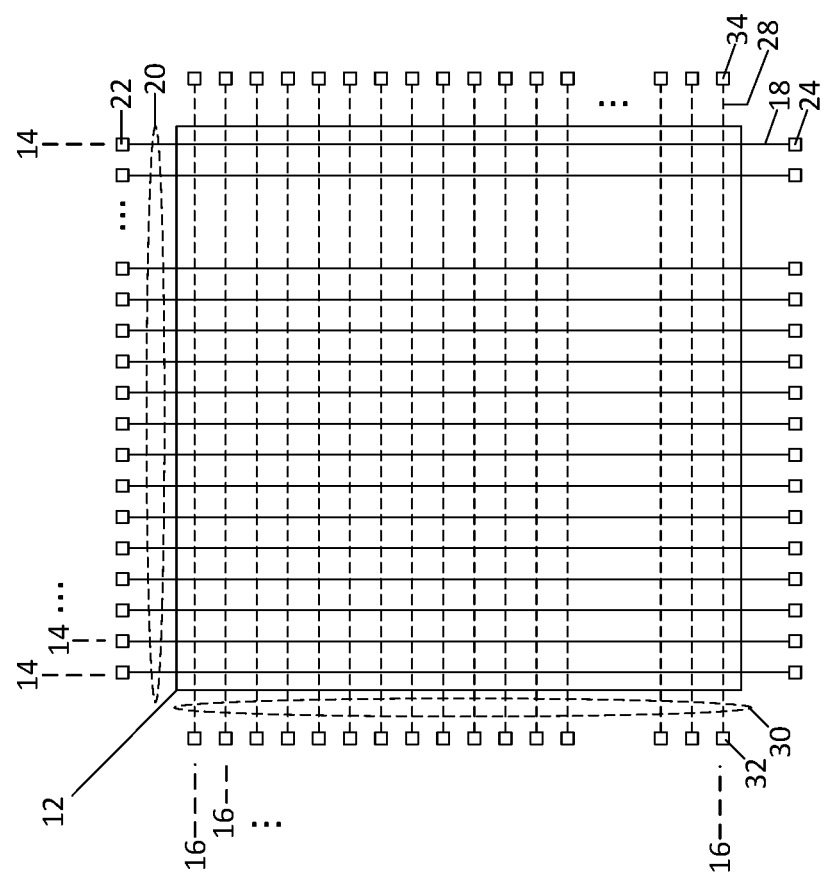
FIGS. 1 and 2 are block diagrams of an example touch sensor having a touch surface spanned by sensing lines.
Figure 1:
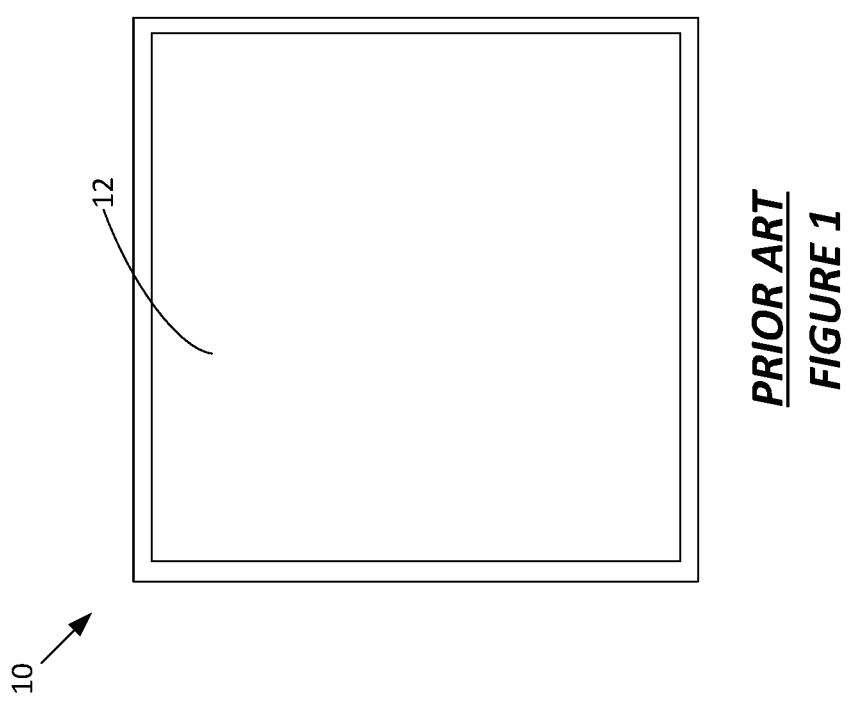

FIG. 1 illustrates a touch sensor 10 having a touch surface 12. FIG. 2 provides further example details, illustrating a division of the touch surface 12 according to columns 14 and rows 16. Sensing lines arrayed in, on, or under the touch surface 12 define the columns 14 and rows 16. In the illustrated example, column "lines" 18 define the respective columns 14, with a full set 20 of column lines 18 horizontally spanning the overall touch surface 12. The column lines 18 are capacitive lines or another type of sensing lines, with each column line 18 having respective ends 22 and 24. Similarly, row lines 28 define the respective rows 16, with a full set 30 of row lines 28 vertically spanning the overall touch surface 12. The row lines 28 are capacitive lines or another type of sensing line, with each row line 28 having respective ends 32 and 34. Other geometric grids may be used, such as crisscrossing diagonal sensing lines, and such arrangements are considered to be interchangeable equivalents with column/row layouts discussed herein.

Although the column lines 18 and the row lines 28 may not have an inherent polarity, in succeeding examples, the ends 22 and 32 are referred to as input ends and the ends 24 and 34 are referred to as output ends. These references make clear which end is driven by an excitation signal and which end provides the sensing signal used for sensing touch inputs. In practice, the ends may be interchangeable, choosing which end is driven and which end is sensed may be arbitrary.

In that regard, in one or more example technologies, one or more electrical characteristics of the sensing signal output by any given sensing line, e.g., given column line 18 or row line 28, vary in dependence on whether there is a touch input to the region of the touch surface 12 corresponding to the column line 18 or row line 28. For example, assuming that an analog excitation signal having a frequency $f_1$ and a voltage $V_{ref}$ is applied to the input end 22 or 32 of a given column line 18 or row line 28, the corresponding output sensing signal will be an analog signal having a frequency $f_1$ and a voltage $V_{ref}$ (or something within a defined margin of $V_{ref}$) if there is no touch input anywhere along or proximate to the involved column line 18 or row line 28. However, the voltage of the output signal will be changed, e.g., reduced, if there is a touch input.

Figure 3:
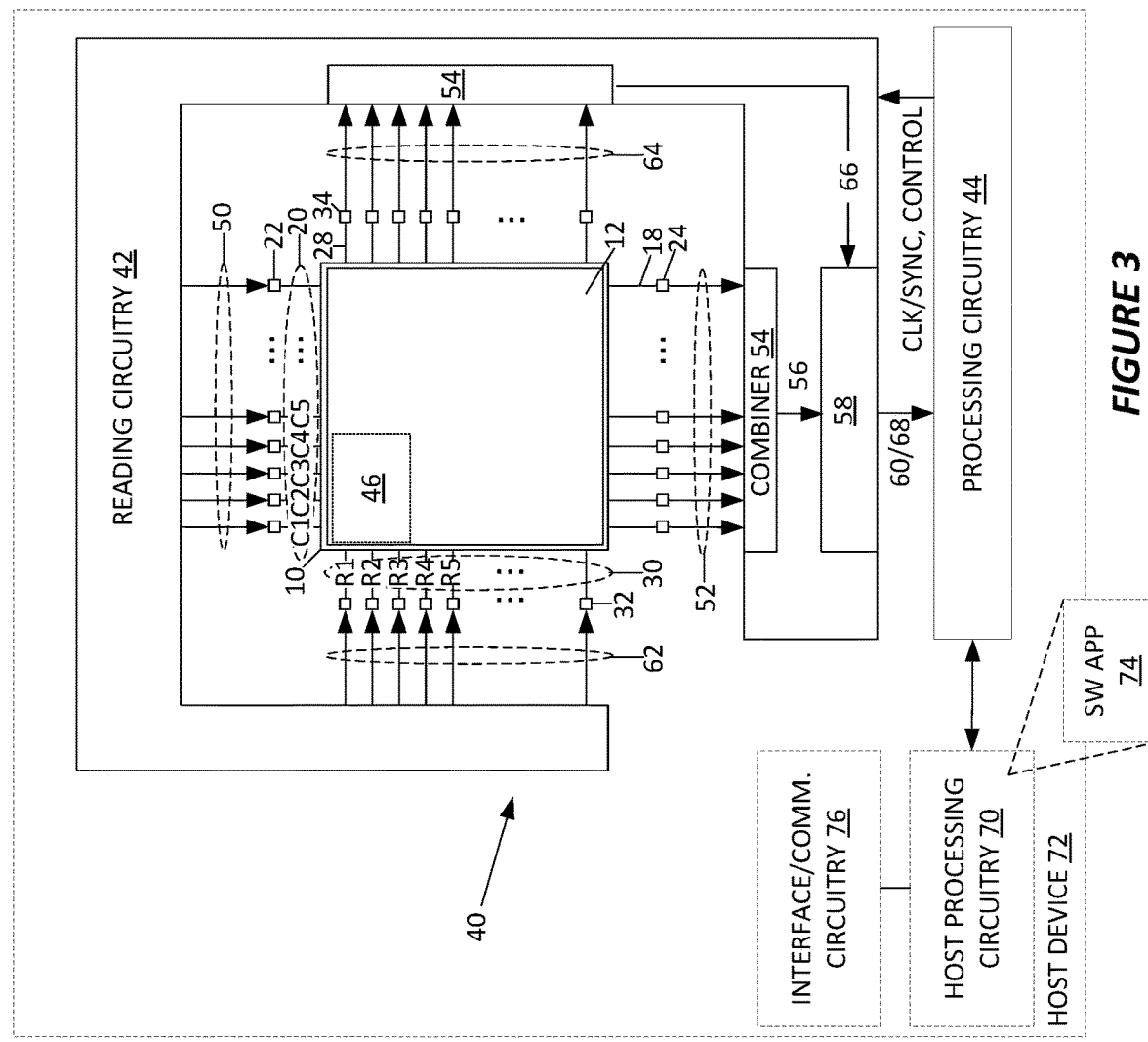
FIG. 3 is a block diagram of an apparatus configured for reading a touch sensor, according to one embodiment.

FIG. 3 illustrates an apparatus 40 according to an example embodiment, where the apparatus 40 is configured to read a touch sensor 10. The apparatus 40 in one or more embodiments comprises reading circuitry 42 and processing circuitry 44. In at least one such embodiment, the apparatus 40 comprises one or more Integrated Circuits (ICs) that are configured to interface a host processor of an electronic device or system to a touchscreen that is used for providing input to one or more software applications executed by the host processor. Example IC implementations include a System-On-a-Chip (SoC) or a Multi-Chip Module (MCM).

"Reading" the touch sensor 10 in this context refers to performing a "transform-based reading" of the touch sensor 10. Transform-based reading refers to the use of frequency-domain transformations for detecting touch inputs to a touch sensor 10. Specifically, transform-based reading involves using analog frequency tones as the excitation signals applied to sensing lines of the touch sensor 10, which results in the sensing signals being corresponding frequency tones having an amplitude or other signal characteristic that depends on the presence or absence of touch inputs.

One advantage of transform-based reading is that multiple sensing signals can be combined and transformed together, to produce resulting frequency-domain sensing values in frequency bins or spectral positions corresponding to the frequency tones of the excitation signals 16. Consequently, the involved device or system need not generate and perform measurements on the sensing signals one at a time, such as would be required in more conventional "scanning" arrangements that use a multiplexed analog-to-digital converter to measure the voltage of each excitation signal. See PCT/EP2020/086794, for example details regarding examples of transform-based reading of a touch sensor.

The processing circuitry 44 is configured to identify a region 46 within an overall touch surface 12 of the touch sensor 10 to be read, where the identified region 46 "involves" one or more sensing lines of the touch surface 12, e.g., one or more column lines 18 among a full set 20 of column lines 18 of the touch sensor 10 and one or more row lines 28 among a full set 30 of row lines 28 of the touch sensor 10. Any particular sensing line 18 or 28 of the touch surface 12 is considered to be "involved" with a particular region of the touch surface 12 if it passes through the region or bounds the region, i.e., is adjacent to the boundary of the region.

"Corresponding" is another term that may be used to refer to an involved sensing line, e.g., for any particular region within the touch surface 12 of the touch sensor 10, sensing lines that run through or bound that region are "corresponding" sensing lines. Hence, the other sensing lines of the touch surface 12, i.e., the ones that are not involved with or corresponding to a particular region of the touch surface 12 are referred to as "uninvolved" or "noncorresponding" sensing lines. Note, however, that a given sensing line, e.g., a given column line 18 or a given row line 28 may be an involved or corresponding sensing line with respect to one identified region 46 but may be an uninvolved or noncorresponding sensing line with respect to another identified region 46 located elsewhere within the touch surface 12.

Thus, the depicted location of the region 46 within the overall touch surface 12 is only an example, and it should be understood that "partial reads" are used to sense touch inputs within a given region 46 anywhere within the overall touch surface 12 or to sense touch inputs within multiple non-contiguous identified regions 46 within the overall touch surface 12, without requiring excitation of all sensing lines of the touch surface 12. In an example case, a software application or applications running on a device containing the apparatus 40 dictates the size, shape, number, and location of regions 46 that are subject to partial reads. Correspondingly, the apparatus 40 is configured to perform partial reads of such identified region(s) 46 by exciting one or more of the respectively involved sensing lines without exciting one or more of the uninvolved sensing lines.

In a partial read directed to one or more identified regions 46—i.e., reading one or more identified regions 46 in the same read cycle—the apparatus 40 in at least one embodiment identifies the sensing lines, e.g., column lines 18 and row lines 28, that are involved sensing lines with respect to any of the one or more identified regions 46. The apparatus 40 does not excite any uninvolved sensing lines and may or may not excite all of the involved sensing lines. For example, full touch-detection resolution may not be needed for reading a given identified region 46, which means that the apparatus 40 can exercise options that reduce power or otherwise simplify the read operations. For example, rather than exciting every sensing line involved in a given identified region 46, the apparatus 40 may excite only a subset of them, e.g., every other sensing line or every third sensing line. Additionally, or alternatively, the apparatus 40 may not use a separate excitation frequency per simultaneously-excited sensing line.

As an example, consider a case where an identified region 46 involves ten column lines 18 and ten row lines 28. Reading the identified region 46 at "full" touch-detection resolution requires exciting every involved column line 18 at a separate excitation frequency, and exciting every involved row line 28 at a separate excitation frequency. However, if a reduced touch-detection resolution is specified or is permissible, the apparatus 40 may excite fewer than all involved column lines 18 or may use the same excitation frequency for more than one of the involved column lines 18 or may do both. The same holds with respect to the involved row lines 28.

The fewer involved sensing lines that are excited with respect to an identified region 46 and the fewer separate excitation frequencies that are used for such excitation, the lower the touch-detection resolution is for the identified region 46. Of course, because a given sensing line may be involved with more than one identified region 46 being read at the same time, the apparatus 40 in one or more embodiments decides on a read configuration—i.e., how many and which ones of the involved sensing lines to excite, and how many and which ones of the excitation frequencies to use—in joint consideration of the touch-detection requirements associated with all identified regions 46 to be read at the same time. To the extent that touch-detection resolution requirements differ between two identified regions 46 that share one or more involved sensing lines, those regions 46 may be regarded as "conflicting" regions, meaning that the read configuration appropriate for one of them is not appropriate for the other one.

To better appreciate the foregoing, a full set 20 of column lines 18 and a full set 30 of row lines 28 spans the overall touch surface 12. "Spans" means that the row lines 28 constituting the full set of row lines 28 are arrayed or distributed over or under or in the overall touch surface 12 so as to provide for row-touch input sensing over the full touch surface 12, and the column lines 18 constituting the full set of column lines 18 are arrayed or distributed over or under or in the overall touch surface 12 so as to provide for column-touch input sensing over the full touch surface 12.

Performing a "full" read of the touch sensor 10 requires the apparatus 40 to excite all sensing lines of the touch sensor 10 and requires the apparatus 40 to use a separate excitation frequency for each sensing line that is excited simultaneously during the read. Advantageously, the processing circuitry 44 is configured to perform partial reads of the touch sensor 10 by limiting sensing only to the involved sensing lines—e.g., the involved column lines 18 and the involved row lines 28.

Figure 4:
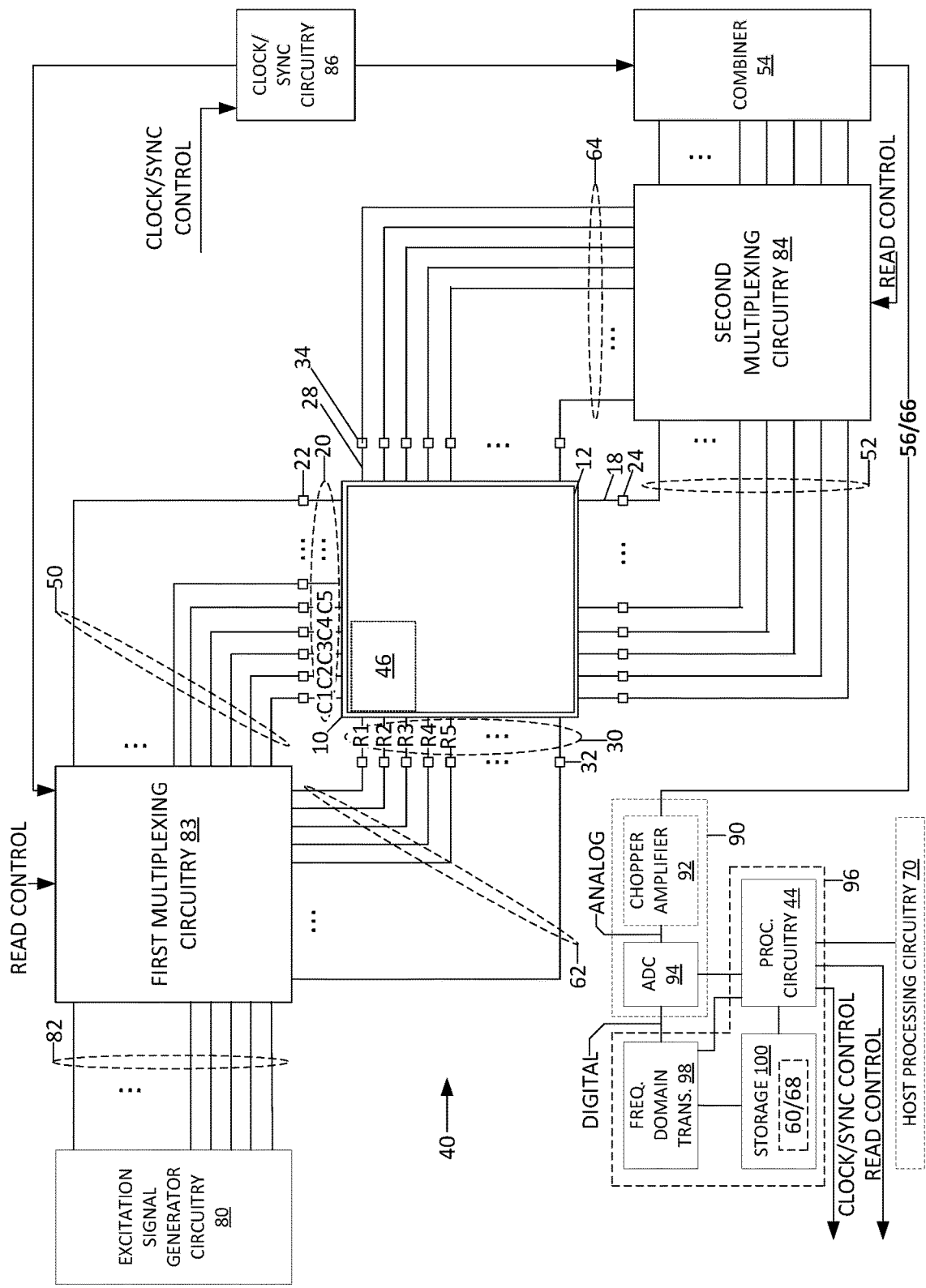
FIG. 4 is a block diagram of example details for the apparatus of FIG. 3.

In the example of FIG. 4, the column lines 18 labeled "C1", "C2", "C3", "C4", and "C5" are "involved with the region 46 because they pass through or bound the region 46. C5 bounds the identified region 46 because the boundary of the region, which may be defined in X-Y coordinates of the touch surface 12, lies between C4 and C5. The remaining column lines 18 are not involved with the region 46. Similarly, the row lines 28 labeled "R1", "R2", "R3", and "R4" are involved with the region 46, while the remaining row lines 28 are uninvolved with respect to the region 46. Of course, the particular sensing lines that are involved with any given region 46 depend on the size and location of the region 46 within the overall touch surface 12. Any given column line 18 or row line 28 may be involved with more than one region 46.

With respect to the apparatus 40 being configured to perform a partial read of an identified region 46 of a touch surface 12 of a touch sensor 10, the apparatus 40 in an example embodiment comprises reading circuitry 42 that is configured to apply selected excitation frequencies to selected sensing lines 18 or 28 of the touch sensor 10, to generate corresponding sensing signals 52 or 64 for detecting touch inputs to the touch surface 12 of the touch sensor 10. Further, the example apparatus 40 comprises processing circuitry 44 configured to identify a region 46 within the touch surface 12 of the touch sensor 10 to be read, and to perform a partial read of the touch sensor 10, based on being configured to:

control the reading circuitry 42 to generate at least one sensing signal 52 or 64 by using one or more excitation frequencies to excite one or more sensing lines 18 or 28 of the touch sensor 10 that are involved with the identified region 46 of the touch surface 12, without exciting one or more uninvolved sensing lines 18 or 28 of the touch sensor 10;

obtain one or more sensing values 60 or 68 in the frequency domain corresponding to the one or more excitation frequencies, based on applying a frequency domain transform to digitized samples corresponding to the at least one sensing signal 52 or 64; and detect a touch input to the identified region 46 of the touch surface (12) by evaluating the one or more sensing values 60 or 68.

Broadly, performing a partial read comprises the processing circuitry 44 controlling the reading circuitry 42 to apply one or more excitation signals to one or more of the involved sensing lines, to generate one or more sensing signals at one or more excitation frequencies. The processing circuitry 44 evaluates the frequency-domain sensing values corresponding to the one or more excitation frequencies, to detect the presence of a touch input or inputs to the region 46 that is the subject of the partial read.

For example, the processing circuitry 44 controls the reading circuitry 42 to apply one or more column excitation signals 50 simultaneously to input ends 22 of one or more of the involved column lines 18, whereby corresponding column sensing signals 52 from output ends 24 of the one or more involved column lines 18 are combined via a combiner 54 to form a combined column sensing signal 56 in the analog domain. The combined column sensing signal 56 is digitized to form a digitized combined column sensing signal that is frequency-domain transformed to obtain one or more column sensing values 60. The digitization and frequency-domain transformation may be performed via an analog-to-digital converter (ADC) and a Discrete Fourier Transform (DFT) processor, collectively shown as circuitry 58 in the diagram. Alternatively, the circuitry 58, which may be referred to as "digitizing circuitry 58", may perform only the signal digitization, with the processing circuitry 44 performing the frequency-domain transformation used to obtain the column sensing values 60.

The column sensing value(s) 60 correspond to the excitation frequency or frequencies used for exciting the one or more involved column lines 18. That is, the frequency-domain transformation of the digitized version of the combined column sensing signal 56 produces frequency-domain values, with each value corresponding to a particular frequency. There will be a frequency-domain value for each excitation frequency used for exiting the one or more involved column lines 18 and there may be additional frequency-domain values produced by the transformation, e.g., as a consequence of noise or other factors. Therefore, it shall be understood that any statement herein that the column sensing values 60 are obtained via a frequency-domain transformation of the digitized version of the combined column sensing signal 56 accounts for processing details such as ignoring any frequency-domain values not corresponding to the excitation frequency or frequencies of interest and selecting the particular one or ones of the frequency-domain values that correspond to the column-excitation frequency or frequencies as the column sensing values 60. Each such column sensing value 60 has an amplitude or magnitude that reflects whether a touch input was present or absent in the corresponding columnar area of the touch surface 12.

According to such example details, the partial read further comprises the processing circuitry 44 controlling the column and row reading circuitry 42 to apply one or more row excitation signals 62 simultaneously to input ends 32 of one or more of the involved row lines 28, whereby corresponding row sensing signals 64 from output ends 34 of the one or more involved row lines 28 are combined via the combiner 54 to form a combined row sensing signal 66 in the analog domain. The combined row sensing signal 66 is digitized via the digitizing circuitry 58 to form a digitized combined row sensing signal, which is frequency-domain transformed to obtain one or more row sensing values 68. As explained for the column sensing values 60, the frequency-domain transformation of the digitized version of the combined row sensing signal 66 may produce a number of values corresponding to different frequencies, such that obtaining the row sensing value(s) 68 includes selecting the particular one or ones of the frequency-domain values that correspond to the excitation frequency or frequencies used for the partial read.

To reiterate the above-explained partial-read processing, a partial read limits "sensing" only to those column lines 18 and row lines 28 that are involved by the identified region(s) 46 targeted by the partial read but it does not necessarily mean that every one of the involved column lines 18 is excited and sensed in the partial read, and, likewise, it does not mean that every one of the involved row lines 28 is excited and sensed in the partial read. For example, one or more embodiments of the apparatus 40 provide for "resolution" control, meaning that only one or at least fewer than all involved column lines 18 and/or row lines 28 are excited in a given partial read, such that not every column line 18 or row line 28 that is involved by the identified region 46 is used for touch sensing with respect to performance of the partial read.

Moreover, even in cases where the identified region involves multiple column lines 18 and/or row lines 28 and all or at least multiple ones of the involved column lines 18 and/or row lines 28 are excited during the partial read—i.e., used for sensing touch input—the apparatus does not necessarily use as many excitation frequencies as there are involved column lines 18 and/or involved row lines 28 being excited. For example, in at least one embodiment or in at least one dynamically-configured operating scenario, it is not necessary to distinguish where within the identified region 46 a touch input occurs. In such cases, all involved column lines 18 that are excited for the partial read may be excited with the same excitation frequency and/or the same may be done for all involved row lines 28 that are excited for the partial read.

Put simply, a partial read of an identified region 46 involves exciting at least one column line 18 that is involved by the identified region 46 and/or exciting at least one row line 28 that is involved by the identified region 46, while not exciting column lines 18 and row lines 28 that are "outside" of the identified region 46. The partial read may or may not use distinct excitation frequencies for each of the one or more involved column lines 18 or involved row lines 28 that are excited for the partial read. However, there will be as many column sensing values 60 of interest in the frequency domain transformation results as there were distinct column excitation frequencies used in the partial read, and the same holds with respect to the row sensing values 68.

The figure shows a connection "60/68" going from the digitizing circuitry 58 into the processing circuitry 44 and this should be understood as showing that column sensing values 60 and row sensing values 68 are provided to or otherwise obtained by the processing circuitry 44. Note that time multiplexing may be involved, such as where the reading circuitry 42 first excites the columns 14 to be read in a given read operation, and then excites the rows 16 to be read in the given read operation. The generation of the column sensing values 60 and the row sensing values 68 may also be time multiplexed, e.g., separate frequency-domain transforms performed. Alternatively, the acquisition of the combined column sensing signal 56 and the combined row sensing signal 66 is multiplexed, along with multiplexing of the corresponding digitization operations used to obtain the digital versions of those signals, with a single frequency-domain transform then applied to buffered samples representing both the combined column sensing signal 56 and the combined row sensing signal 66.

However, the acquisition is performed, the number of column sensing values 60 may equal the number of row sensing values 68 or there may be a greater or lesser number of column sensing values 60 in comparison to the row sensing values 68. The numbers depend on the size, shape, and orientation of the identified region 46, and the desired touch-sensing resolution for touch detection within the identified region 46.

Performing the partial read further comprises the processing circuitry 44 detecting a touch input to the identified region 46 of the touch sensor 10 by evaluating the one or more column sensing values 60 and the one or more row sensing values 68. Again, for any given partial read, there will be as many column sensing values 60 as there were separate excitation frequencies used for column-line excitation and there will be as many row sensing values 68 as there were separate excitation frequencies used for row-line excitation.

The processing circuitry 44 in one or more embodiments is further configured to choose the number of separate excitation frequencies used for the one or more column excitation signals 50 according to the number of individual column lines 18 to be distinguished among the one or more involved column lines 18 that are excited for the partial read. Similarly, in one or more embodiments, the processing circuitry 44 is further configured to choose the number of separate excitation frequencies used for the one or more row excitation signals 62 according to the number of individual rows 16 to be distinguished among the one or more involved rows 16 that are excited for the partial read.

For both the column case and the row case, the excitation signal applied to one column line 18 or one row line 28 may be considered as separate from the excitation signal applied to another column line 18 or row line 28, even though they may be at the same frequency. Put another way, the number of column excitation signals 50 that are active for a partial read matches the number of involved column lines 18 to be excited for the partial read, but the active column excitation signals 50 may all be at the same excitation frequency, or they may each be at a different excitation frequency or different subsets of them may be at different excitation frequencies. The same logic and flexibility hold with respect to the row excitation signals 62 for any given partial read.

The processing circuitry 44 in at least one embodiment is further configured to decide how many columns 14 from among the involved columns 14 (i.e., column lines 18) or how many rows 16 (i.e., row lines 28) from among the involved rows 16 are to be excited using separate excitation frequencies, in dependence on a touch-detection resolution to be used for detecting the touch input to the identified region 46.

To apply the one or more column or row excitation signals 50 or 62, the processing circuitry 44 in one or more embodiments is configured to select one or more excitation frequencies from a larger set of excitation frequencies used for reading the overall touch surface 12 or for reading regions of the overall touch surface 12 that are larger than the identified region 46. In at least one such embodiment, the processing circuitry 44 is configured to select the one or more excitation frequencies from the larger set of excitation frequencies by selecting a contiguous subset of excitation frequencies from the larger set of excitation frequencies.

For example, if the overall set of excitation frequencies includes frequencies f1, f2, f3, and so on, in order of increasing frequency, the processing circuitry 44 may be configured to select f1 first, and then, in dependence on how many excitation frequencies are to be used, select f2, and so on. In at least one such embodiment, to select the one or more excitation frequencies from the larger set of excitation frequencies, the processing circuitry 44 is configured to determine a number of excitation frequencies to be used and select that number of lowest-frequency ones among the larger set of excitation frequencies.

Noise measurements corresponding to individual excitation frequencies in the larger set of excitation frequencies are available in at least one embodiment. Correspondingly, to select the one or more excitation frequencies from the larger set of excitation frequencies, the processing circuitry 44 is configured to determine a number of excitation frequencies to be used and select that number of lowest-noise ones among the larger set of excitation frequencies, with the selecting performed in order of increasing excitation frequency. As an example, the processing circuitry 44 may be configured to measure the noise detected on respective ones of the excitation frequencies in the larger set(s) of excitation frequencies used for full reads of the touch sensor 10 and use those noise measurements to decide which subset(s) of excitation frequencies to use when performing a partial read of the touch sensor 10.

In one or more embodiments, the processing circuitry 44 is configured to identify the region 46 within an overall touch surface 12 of the touch sensor 10 to be read by obtaining touch-control information from a software application running on a host device 72 that includes the touch sensor 10. The touch-control information indicates the region 46, such as in X-Y coordinates, row-column numbers, etc.

In at least one embodiment, the identified region 46 is one among two or more identified regions 46. Thus, in one or more embodiments or in one or more operational scenarios, the processing circuitry 44 may identify more than one region 46 of the overall touch surface 12 to be read in a given read cycle, and it excites only those column lines 18 and row lines 28, or subsets thereof, that are used for detecting touches in the identified regions 46.

In at least one embodiment, the identified region 46 corresponds to a touch control displayed by a software application 74 running on a host device 72 that includes the touch sensor 10 and may include interface and/or communication circuitry 76 (depicted as "INTERFACE/COMM. CIRCUITRY"). In this regard, the touch sensor 10 in at least one embodiment comprises a touch screen or is included within a touch screen assembly, such that the software application displays touch-responsive controls, such as buttons, sliders, or the like, on the touch screen and the touch sensor 10 is used to detect user touches directed to one or more of the displayed touch controls.

FIG. 4 depicts example details for the arrangement of FIG. 3. Excitation signal generator circuitry 80 generates a set of excitation signals 82, with each excitation signal being, for example, an analog signal at a specific frequency, such as a sinusoidal analog waveform having an amplitude at some defined voltage. The excitation signal generator circuitry 80 may be configured to generate excitations signals 82 at as many unique frequencies as there are columns 14 and/or rows 16 of the touch sensor 10. Thus, for a "full read" of the touch sensor 10, there are as many active ("on") column excitation signals 50 as there are columns 14 of the touch sensor 10, with each column excitation signal 50 being at a unique frequency. The same holds for the row excitation signals 62 for a full read of the touch sensor 10.

However, for partial read, the first multiplexing circuitry 83 activates or turns on only as many column excitation signals 50 as there are involved column lines 18 to be excited for the partial read, and the same holds for the row excitation signals 62 with respect to the number of involved row lines 28 to be excited for the partial read. Moreover, the first multiplexing circuitry 83 can "connect" the same excitation signal 82—or voltage—or current-buffered versions thereof—to more than one column excitation signal 50 and/or to more than one row excitation signal 62, thereby allowing two or more of the active column excitation signals 50 and/or two or more of the active row excitation signals 62 to be at the same excitation frequency during any given partial read. Read control lines into the first and second multiplexing circuitries 83 and 84 allow for dynamic configuration of such operations on the fly.

To reiterate, in a full read, all columns 14 and all rows 16 are read, for touch detection anywhere on the overall touch surface 12. All column lines 18 are energized simultaneously in a full read, with each column line 18 being energized with a respective one of the excitation signals 82, meaning that each column line 18 and each corresponding column sensing signal 52 is associated with a respective one of the excitation frequencies used for the columns 14. Similarly, all row lines 28 are energized simultaneously in a full read, with each row line 28 being energized with a respective one of the excitation signals 82, meaning that each row line 28 and each corresponding row sensing signal 64 is associated with a respective one of the excitation frequencies used for the rows 16.

Contrastingly, in a partial read, only a subset of the columns 14 and/or a subset of the rows 16 are read, meaning that only a subset of the excitation frequencies is used. Techniques for partial reading disclosed herein optimize or at least improve partial reading in terms of power consumption and computational complexity by selecting particular ones of the excitation frequencies used for partial reading of the touch sensor 10. In an example embodiment, first and second multiplexing circuitries 83 and 84 are used for full and partial reads of the touch sensor 10, with the processing circuitry 44 outputting clock/sync control signals to clock/sync circuitry 86, to control clocking and synchronization of the first and second multiplexing circuitry 83 and 84 for full and partial reads of the touch sensor 10.

Further, the processing circuitry 44 outputs read control signals to the first and second multiplexing circuitry 83 and 84, to control: (a) whether a full read or a partial read of the touch sensor 10 is performed, (b) which columns 14 and/or which rows 16 are read in a partial read of the touch sensor 10, and, in at least one embodiment, which particular excitation signals 82—i.e., which particular excitation frequencies—are used for a partial read. In this respect, the first multiplexing circuitry 83 in one or more embodiments includes a crossbar switching circuit or the like, for selectable mapping of individual excitation signals 82 to any one or more of the columns 14 or rows 16 (i.e., to any one or more of the column lines 18 and/or the row lines 28), such that the processing circuitry 44 decides which excitation frequencies are used to perform a partial read of the touch sensor 10. Further, partial-read operations include controlling or otherwise configuring the frequency-domain transform circuitry 98, i.e., for "extracting" the column sensing and row sensing values 60 and 68, corresponding to the excitation frequency or frequencies used to excite the involved column lines 18 and the involved row lines 28.

For a full read, the processing circuitry 44 controls the first multiplexing circuitry 83 to apply one of the excitation signals 82 to each of the columns 14 of the touch sensor, with each excitation signal 82 being at a respective excitation frequency and with all columns 14 excited simultaneously. Correspondingly, the second multiplexing circuitry 84 applies the resulting output column sensing signals 52 to the combiner 54, which forms the combined column sensing signal 56. That signal is an analog signal having frequency-differentiated signal components corresponding to all columns 14 of the touch sensor 10, with each signal component having an amplitude that depends on whether there is a touch input along the corresponding column 14 of the touch sensor 10.

The same details hold with respect to rows 16, when performing a full read of the touch sensor 10, meaning that the combined row sensing signal 66 for a full read includes a respective frequency-dependent signal component for each of the rows 16. After digitization of the combined column sensing signal 56 and the combined row sensing signal 66 for a full read, frequency-domain transformation yields a set of column sensing values 60 corresponding to the full set of columns 14 of the touch sensor 10, and a set of row sensing values 68 corresponding to the full set of rows 16 of the touch sensor. The amplitude or magnitude of each column sensing value 60 and each row sensing value 68 indicates whether a touch input was present along the corresponding row 14 or column 16.

As noted, partial reads contrast with the above-described full reads in that the processing circuitry 44 controls the first and second multiplexing circuitry 83 and 84 so that only a subset of the columns 14 and/or a subset of the rows 16 is/are excited and sensed during the read. Further, the processing circuitry 44 may control the excitation signal generator circuitry 80 to generate only that subset of excitation frequencies to be used for the partial read. Alternatively, the excitation signal generator circuitry 80 generates the full set of excitation frequencies, with only some of them being used for the column and/or row excitation.

An example signal processing chain for performing full and partial reads appear in FIG. 4 and includes analog circuitry 90, comprising a chopper amplifier 92 and an ADC 94. The chopper amplifier 92 may or may not be included but provides a mechanism for reducing noise in the combined column sensing signal 56 and the combined row sensing signal 66. The ADC 94 converts the combined column sensing signal 56 and the combined row sensing signal 66 into the digital domain—i.e., produces digital samples taken at discrete times from the analog waveforms constituting the combined column sensing signal 56 and the combined row sensing signal 66.

Digital circuitry 96 includes a frequency-domain transform circuit 98, storage 100, and the processing circuitry 44. The frequency-domain transform circuit 98 may be implemented as fixed hardware or may be implemented via special adaptation of general-purpose processing circuitry via programmatic configuration. In that regard, the processing circuitry 44 may be fixed or dedicated circuitry or programmatically configured circuitry or a mix of both. The processing circuitry 44 in one or more embodiments comprises a microprocessor, microcontroller, DSP, or other digital processing circuitry that operates as described herein based at least in part on the execution of computer program instructions, e.g., held in the storage 100.

The storage 100 comprises one or more types of computer-readable media and may include one or more types of memory circuits, including volatile and/or non-volatile memory circuits or other forms of storage. In one or more embodiments, the storage 100 comprises or includes buffer memory for buffering the digital sample values constituting the digitized versions of the combined column sensing signal 56 and the combined row sensing signal 66, for frequency-domain transformation, and for holding the resulting column sensing values 60 and row sensing values 68, for evaluation by the processing circuitry 44 for touch-input detection.

Also as shown, the processing circuitry 44 may interface with host processing circuitry 70. For example, the processing circuitry 44 may provide a high-level communication interface for touch detection and control by the host processing circuitry 70 and may receive information from the host processing circuitry 70, such as information about which region(s) of the overall touch surface 12 are to be read or are "active" with respect to a software application. The processing circuitry 44 uses such information, for example, to identify the region(s) 46 to be read for partial reading of the touch sensor 10.

Figure 5A:
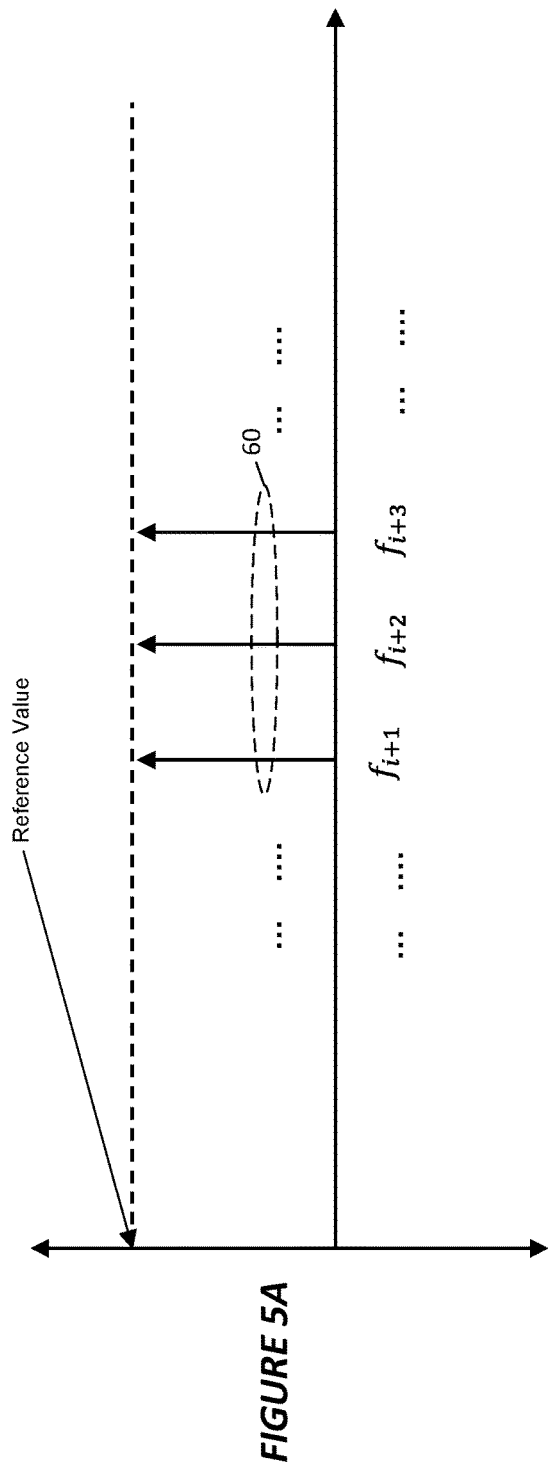
FIGS. 5A, 5B, 6A, and 6B are plots of example frequency-domain values evaluated by the apparatus of FIG. 3, for detecting touch inputs.
Figure 5B:
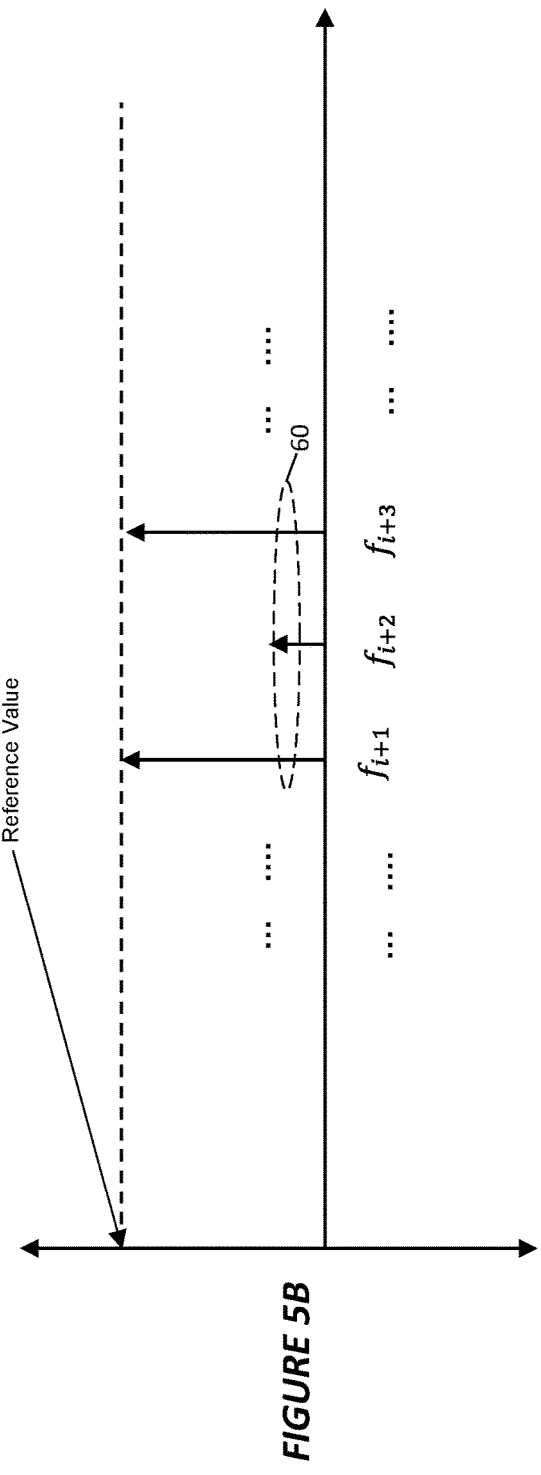

FIGS. 5A and 5B illustrate example column sensing values 60 for three excitation signals 82 at three different excitation frequencies, with FIG. 5A illustrating representative column sensing values 60 with no touch present along any of the involved columns 14 of the touch sensor 10 and FIG. 5B illustrating the case where a touch input is present along the column(s) 14 associated with the excitation frequency denoted $f_{i+2}$ in the diagram.

As an example, FIG. 5A can be understood as corresponding to an example partial read of the touch sensor 10 where the identified region 46 involves three columns 14 and the partial read is intended to distinguish between each of the three columns 14. However, depending on the number of involved columns 14 and the touch resolution to be provided by the partial read-which the processing circuitry 44 may know from information provided via the host processing circuitry 70—the number of excitation frequencies used in a partial read may be less than the number of involved columns 14. For example, if the only requirement is to detect whether there is a touch input anywhere within an identified region 46, then the same excitation frequency may be used for all involved columns 14 and/or all involved rows 16. Or the number of involved columns 14 or involved rows 16 may be divided into chunks or blocks, with each chunk or block excited with a different excitation frequency, to yield touch-location resolution within the identified region 46 that is coarser than per column/per row by finer than per region. Still further, if the touch-detection scenario allows for coarse touch detection, fewer than all involved column lines 18 and/or involved row lines 28 may be excited for the partial read.

Figure 6A:
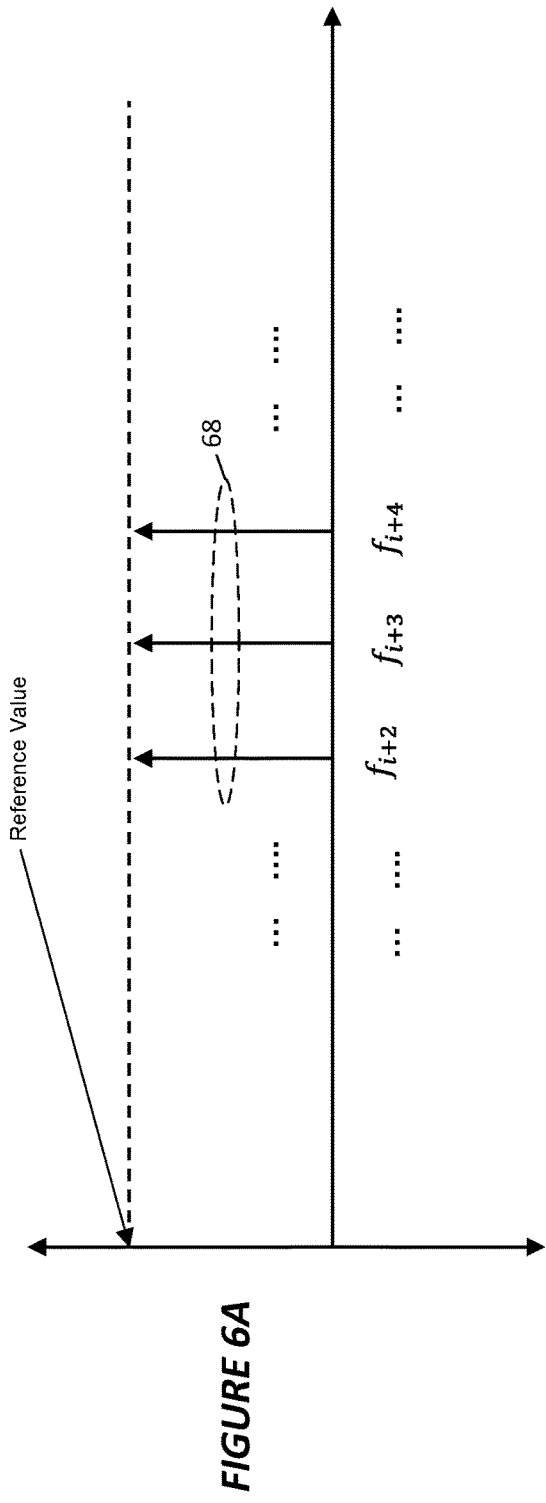
Figure 6B:
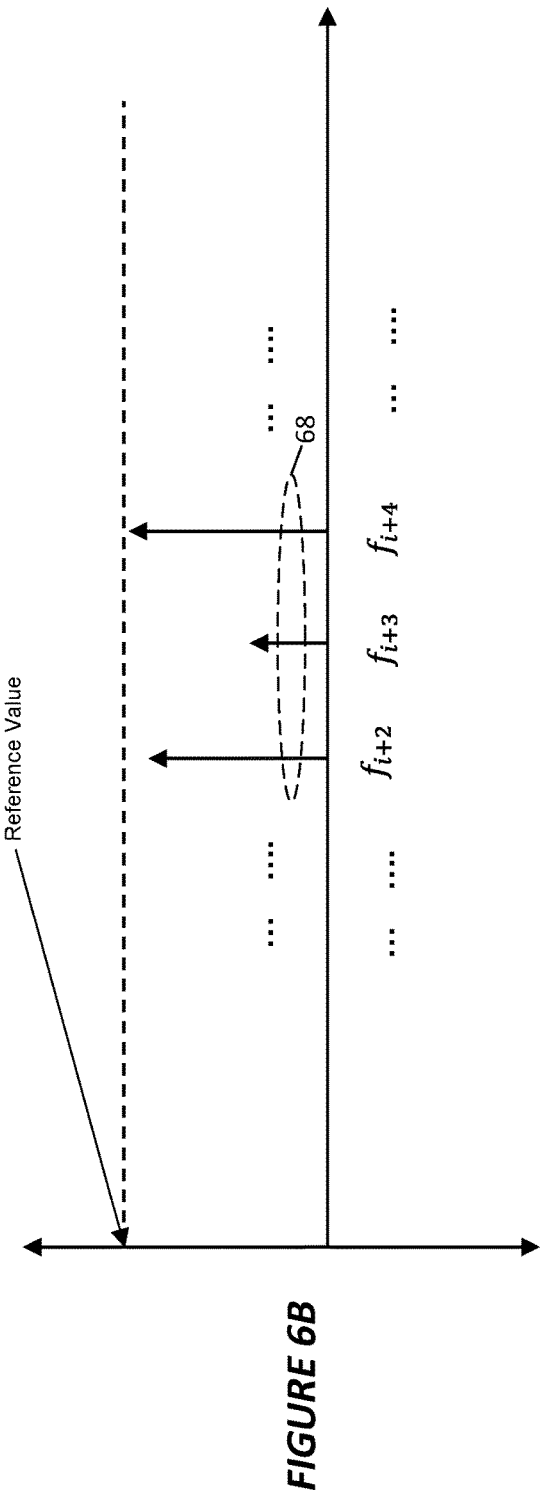

FIGS. 6A and 6B are similar to FIGS. 5A and 5B except that they depict example row sensing values 68. In FIGS. 5A, 5B, 6A, and 6B, the "reference value" may be a numeric value representing the nominal voltage of the excitation signals 82 used to read the touch sensor 10, i.e., the digital value corresponding to the voltage of an output column sensing signal 52 or output row sensing signal 64, in the case that no touch is present along the corresponding column or row region of the touch surface 12. Of course, there may be some natural variance around the nominal reference value and the processing circuitry 44 may treat any column or row sensing value 60 or 68 as representing "no touch" if it falls within a defined range of the nominal reference value.

FIG. 7 illustrates one embodiment of a method 700 of reading a touch sensor, such as the touch sensor 10 described above. The method 700 comprises identifying (Block 702) a region 46 within an overall touch surface 12 of the touch sensor 10 to be read. That is, the method 700 includes identifying the region 46 to be read, where the region 46 is less than the overall touch surface 12. The identified region 46 involves one or more column lines 18 among a full set 20 of column lines 18 of the touch sensor 10 and involves one or more row lines 28 among a full set 30 of row lines 28 of the touch sensor 10. The full set 20 of column lines 18 and the full set 30 of row lines 28 span the overall touch surface 12, such as being geometrically arrayed or otherwise distributed over, under, or within the touch surface 12.

The method 700 further comprises performing (Block 704) a partial read of the touch sensor 10 by generating (Block 706) at least one sensing signal 52 or 64 by using one or more excitation frequencies to excite one or more sensing lines 18 or 28 of the touch sensor 10 that are involved with the identified region 46 of the touch surface 12, without exciting one or more uninvolved sensing lines 18 or 28 of the touch sensor 10. Consider an example scenario where there are fifty column sensing lines 18 and fifty row sensing lines 28 and where the identified region 46 to be read during the partial read encompasses only ten column lines 18 and only ten row lines 28. In this example case, the partial read excites one or more of the ten involved column lines 18 and one or more of the ten involved row lines 28. The number of involved column lines 18 and involved row lines 28 that are excited, and the number of separate excitation frequencies used for the excitation depends on the required touch-detection resolution.

Turning back to details of the method 700, the method 700 further includes obtaining (Block 708) one or more sensing values 60 or 68 in the frequency domain corresponding to the one or more excitation frequencies, based on applying a frequency domain transform to digitized samples corresponding to the at least one sensing signal 52 or 64. Further, the method 700 includes detecting (Block 710) a touch input to the identified region 46 of the touch surface 12 by evaluating the one or more sensing values 60 or 68.

The method 700 in one or more embodiments includes choosing the number of excitation frequencies to use, in dependence on a touch-detection resolution to be used for detecting touch inputs to the identified region 46. In the same or other embodiments, the method 700 includes choosing how many of the involved sensing lines 18 or 28 to excite, in dependence on a touch-detection resolution to be used for detecting touch inputs to the identified region 46. In at least one embodiment, the method 700 includes choosing how many of the involved sensing lines 18 or 28 to excite and how many excitation frequencies to use for exciting the chosen sensing lines 18 or 28, in dependence on a touch-detection resolution to be used for detecting touch inputs to the identified region 46.

In at least one embodiment, the method 700 includes choosing which particular excitation frequencies to use, from a larger set of excitation frequencies, in dependence on a defined selection strategy. The defined selection strategy, for example, involves choosing the particular excitation frequencies from a defined set of excitation frequencies, in dependence on noise measurements made for respective excitation frequencies in the defined set of excitation frequencies. The defined selection strategy in another example involves choosing the particular excitation frequencies from a defined set of excitation frequencies, to minimize the spectral range spanned by the chosen excitation frequencies. Of course, this latter example may also consider noise, e.g., by choosing excitation frequencies to minimize the spectral range spanned by the chosen excitation frequencies, where the choosing is constrained to exclude noisy frequencies or to prioritize quiet or lower-noise frequencies.

Identifying the region 46 within the overall touch surface 12 of the touch sensor 10 to be read comprises, in at least one embodiment, obtaining touch-control information from a software application 74 running on a host device 72 that includes the touch sensor 10, with the touch-control information indicating the region 46. As noted, the identified region 46 may be one of two or more identified regions 46 to be read during the partial read, where each identified region 46 has respectively involved sensing lines 18 or 28.

Broadly, a partial read of the touch sensor 10 limits sensing only to the involved sensing lines or a subset thereof, e.g., one, some or all involved column lines 18 and one, some, or all involved row lines 28. Simply put, a partial read limits sensing to one or more of the involved sensing lines, which reduces the number of sensing lines that are excited and reduces the number of excitation frequencies that are generated or otherwise applied, which saves power in comparison to full reads of the touch sensor 10. Also, the partial read simplifies frequency-domain processing as compared to full reads.

Thus, in a row/column example context, a partial read of an identified region 46 of the touch surface 12 of a touch sensor 10 includes: reading one or more of the involved column lines 18 by applying one or more column excitation signals 50 simultaneously to input ends 22 of the one or more involved column lines 18, combining corresponding column sensing signals 52 from output ends 24 of the one or more involved column lines 18 to form a combined column sensing signal 56 in the analog domain, digitizing the combined column sensing signal 56 and applying a frequency-domain transform to the digitized combined column sensing signal to obtain one or more column sensing values 60 corresponding to the excitation frequency or frequencies used for the one or more column excitation signals 50. The partial read further includes reading one or more of the involved row lines 28 by: applying one or more row excitation signals 62 simultaneously to input ends 32 of the one or more involved row lines 28, combining corresponding row sensing signals 64 from output ends 34 of the one or more involved row lines 28 to form a combined row sensing signal 66 in the analog domain, digitizing the combined row sensing signal 66 and applying a frequency-domain transform to the digitized combined row sensing signal to obtain one or more row sensing values 68 corresponding to the excitation frequency or frequencies used for the one or more row excitation signals 62.

The partial read further comprises detecting a touch input to the identified region 46 of the touch sensor 10 by evaluating the one or more column sensing values 60 and the one or more row sensing values 68. "Evaluating" the column sensing value(s) 60 and the row sensing value(s) 68 comprises, for example, comparing the relative magnitudes or comparing the respective magnitudes to a reference value or reference range, to detect values that reflect the presence of a touch input. Also, as noted, the frequency-domain transformation results may include values corresponding to spurious frequencies or frequencies that are not of interest, such that the results may need to be parsed or otherwise processed to "extract" the value(s) corresponding to the column/row excitation frequency or frequencies used during the partial read.

In at least one embodiment, performing a partial read includes choosing the number of separate excitation frequencies used for the one or more column excitation signals 50 according to the number of individual columns 14 to be distinguished from among the one or more involved column lines 18 that are excited during the partial read. Additionally, or alternatively, in at least one embodiment, performing a partial read includes choosing the number of separate excitation frequencies used for the one or more row excitation signals 62 according to the number of individual rows 16 to be distinguished among the one or more involved row lines 28 that are excited during the partial read.

Performing a partial read may also include deciding how many columns 14 from among the involved columns 14 or how many rows 16 from among the involved rows 16 are to be excited using separate excitation frequencies, in dependence on a touch-detection resolution to be used for detecting the touch input to the identified region 46.

Applying the one or more column or row excitation signals comprises, for example, selecting one or more excitation frequencies from a larger set of excitation frequencies used for reading the overall touch surface 12 or for reading regions of the overall touch surface 12 that are larger than the identified region 46. In one or more embodiments, the apparatus 40 is configured to select the one or more excitation frequencies from the larger set of excitation frequencies according to a defined selection strategy.

Various selection strategies may be implemented by the processing circuitry 44, with various advantages and implications for the frequency-domain transformation used to obtain the column and row sensing values 60 and 68. One approach minimizes spectral range, e.g., by selecting lowest-frequency, contiguous ones of the excitation frequencies from the larger set. Another approach offers good noise immunity by enhancing the frequency-domain separation between the column and row sensing values 60 and 68, based on selecting non-adjacent excitation frequencies from the larger set—e.g., every other one, every second one, etc.

Another example selection strategy relies on noise measurements. That is, noise measurements corresponding to individual excitation frequencies in the larger set of excitation frequencies are available in at least one embodiment. Correspondingly, the processing circuitry 44 in at least one embodiment is configured to select the one or more excitation frequencies from the larger set of excitation frequencies in dependence on the noise measurements.

The noise measurements are obtained, for example, from full reads or "dummy" reads of the touch sensor 10, using the apparatus 40. As a particular example, the processing circuitry 44 may be configured to identify a portion or portions of the spectrum spanned by the larger set of excitation frequencies that are the quietest—exhibit the lowest noise—and select the excitation frequencies to be used from the lowest or lower-noise portion(s) of the excitation-frequency spectrum.

In at least one embodiment, the defined selection strategy is a composite or amalgam of individual selection strategies, such as a composite strategy that uses noise measurements to identify candidate excitation frequencies in the larger set, and then selects from among the candidates according to one or more optimization criteria, such as choosing the lowest-frequency ones, observing some minimum non-adjacency criteria, minimizing the overall spectral range spanned by the selected excitation frequencies, etc. Of course, some combinations of individual selection goals may be in tension, such as where choosing non-adjacent excitation frequencies increases the overall spectral range spanned by the selected subset of excitation frequencies. Any selection strategy that combines competing individual goals may be understood as a balancing of those goals.

Identifying the region 46 within an overall touch surface 12 of the touch sensor 10 to be read comprises, for example, obtaining touch-control information from a software application 74 running on a host device 72 that includes the touch sensor 10. The touch-control information indicates the region 46 directly or indirectly.

The identified region 46 may be one among two or more identified regions 46. Or, more succinctly, the identified region 46 may be one or more regions of the overall touch surface 12, such that the involved columns 14 and the involved rows 16 involved in a partial read are those columns 14 and rows 16 that are involved with one or more of the two or more identified regions 46.

The identified region 46 comprises, for example, one or more regions corresponding to touch regions indicated by a software application 74 running on a host device 72 that includes the touch sensor 10. For example, a software application 74 at any given time displays a certain number of touch controls or other touch-driven user-interface elements and provides information indicating the locations of such controls to the apparatus 40, which can then identify which region(s) 46 of the overall touch surface 12 to read, in any given read operation, as opposed to always performing full reads of the touch surface 12.

Figure 9:
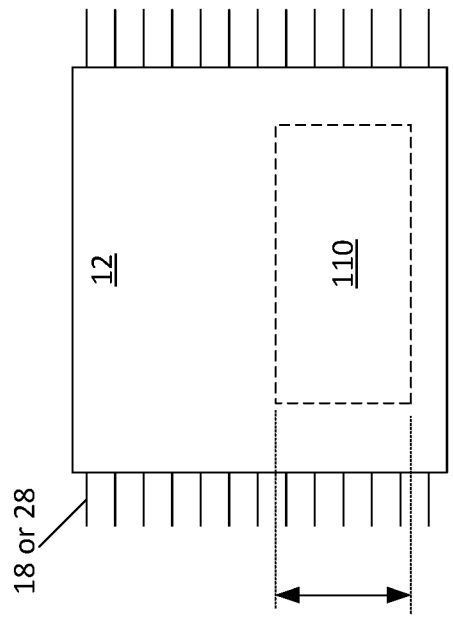
FIG. 9 is a block diagram of an example region on a touch surface of a touch sensor that is read as an aggregated touch region.
Figure 8:
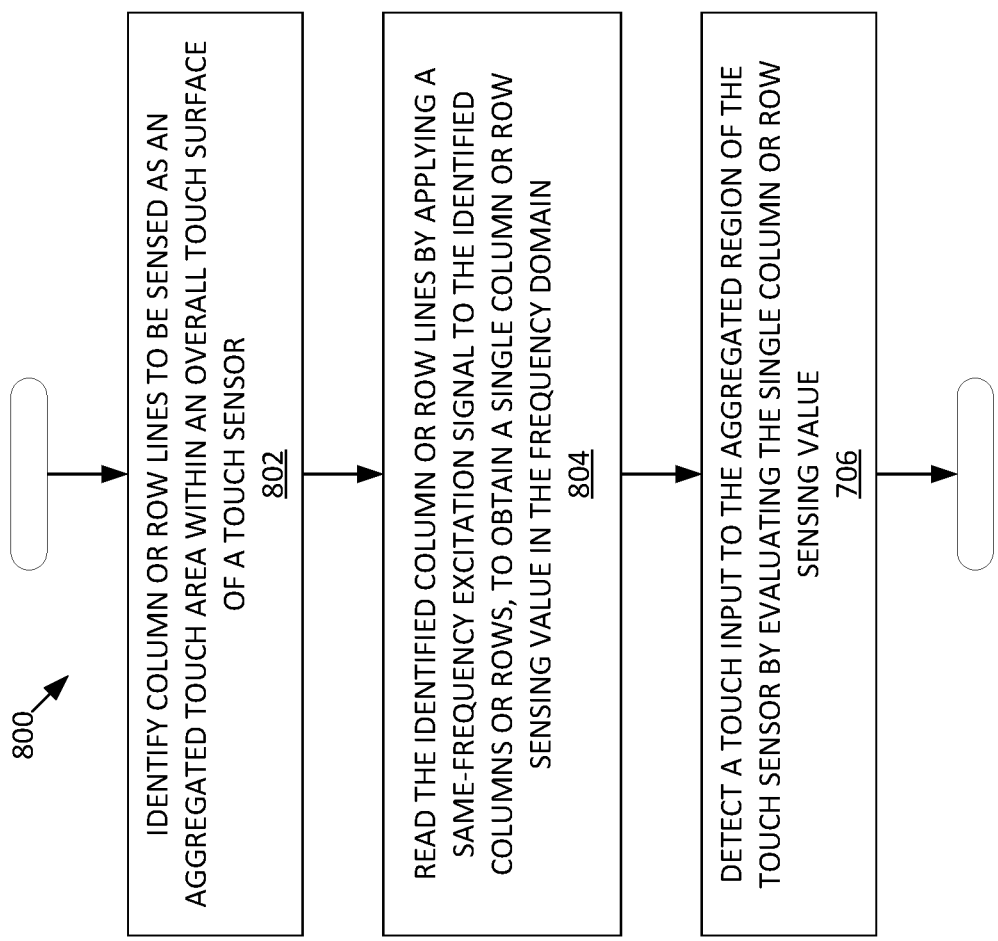
FIG. 8 is a logic flow diagram of a method of reading a touch sensor, according to another embodiment.

FIG. 8 illustrates another method 800 of reading a touch screen 10 having a set 20 of individual column lines 18 for detecting touch inputs along corresponding vertical areas of an overall touch surface 12 of the touch sensor 10 and having a set 30 of individual row lines 28 for detecting touch inputs along corresponding horizontal areas of the overall touch surface 12. The method 800 includes identifying (Block 802) column or row lines 18, 28 to be sensed as an aggregated touch area, such as the aggregated touch area 110 shown in FIG. 9.

The method 800 further includes reading (Block 804) the identified column or row lines 18, 28 by applying a same-frequency excitation signal 50 or 62 to input ends 22 or 32 of the identified column or row lines 18 or 28, and combining the resulting column or row sensing signals 52 or 64 output from the output ends 24 or 34 of the identified column or row lines 18 or 28. Such combining is done to obtain a combined column or row sensing signal 56 or 66, that is digitized and frequency-domain transformed, to obtain a single column or row sensing value 60 or 68 corresponding to the frequency of the excitation signal. Correspondingly, the method 800 includes detecting (Block 806) a touch input to the touch surface 12 in the aggregated touch area 110 by evaluating the single column or row sensing value 60 or 68.

Thus, a partial read may use a single excitation frequency for more than one column 14 of the touch sensor 10, when it is not required to distinguish touch locations among those particular columns 14. Additionally, or alternatively, a partial read may use a single excitation frequency for more than one row 16 of the touch sensor 10, when it is not required to distinguish touch locations among those particular rows 16. Further, a partial read may include one or more first identified regions 46 and one or more second identified regions 46. In the first identified region(s) 46, the apparatus 40 uses per-column and/or per-row excitation frequencies for discerning touch locations with respect to the individual columns 14 and rows 16 involved in the first identified region(s) 46. However, in the same partial read, the apparatus 40 uses a single excitation frequency for all of the columns 14 and/or rows 16 involved within each of the second identified region(s) 46.

In other words, for a partial read involving more than one identified region 46 to be read or involving an identified region 46 to be read with a varying touch-detection resolution, the apparatus 40 may use a mix of common-frequency sensing and differentiated-frequency sensing. Here, "common-frequency sensing" refers to excitation of more than one sensing line at the same time, using the same frequency, such that both sensing lines contribute to the same corresponding sensing value in the frequency domain. Conversely, "differentiated-frequency sensing" refers to excitation of multiple sensing lines at the same time, using a different frequency for each sensing line, to obtain a frequency-domain sensing value corresponding to each sensing line.

FIG. 10 illustrates an example host device 72, which includes host processing circuitry 70 and associated memory/storage 75, along with a user interface 77 comprising a touch sensor 10 and an implementation of the apparatus 40 for reading the touch sensor 10. The host device 72 may also include the earlier-illustrated communication circuitry 76, which may include transceiver circuitry comprising receiver circuitry 120 and transmitter circuitry 122, for wired and/or wireless communications. Still further, the host device 72 may include a power supply/battery 124. Example host devices 72 include personal computing devices, such as tablets, touch-enabled laptops, smart phones, etc.

FIG. 11 depicts a "unit" or assembly 130 that includes a touch sensor 10 and an implementation of the apparatus 40 configured for reading the touch sensor 10. For example, the unit 130 comprises a capacitive touch screen as the touch sensor 10 and includes an implementation of the apparatus 40 for reading the capacitive touch screen. Of course, other types or variations of touch sensor may be included in the unit 130, which may be provided for incorporation into various types of electronic systems or devices.

FIG. 12 illustrates one example of such incorporation, where the unit 130 forms a part of an electronic device 140. In an example embodiment, the electronic device 140 comprises a wireless communication terminal or other mobile communication device, such as a smart phone, tablet, or other computing device that includes the apparatus 40 for interfacing with a touch sensor 10. According to terminology used by the Third Generation Partnership Project (3GPP), the electronic device may be a "User Equipment" or "UE".

The electronic device 140 may be understood as an example host device 72. In the illustrated embodiment, the electronic device 140 includes communication circuitry 142, processing and interface circuitry 144, a user interface 146 that includes the unit 130, and a power supply and/or battery 148. The electronic device 140 is, for example, configured for operation in a cellular network or other Wide Area Network (WAN), such as in a wireless communication network that operates according to 3GPP specifications.

With the above in mind, methods and apparatus described herein provide a solution that reduces operating power and/or computational complexity by performing partial reads of a touch sensor, within the meaning of "partial read" as described above. A host device or system has knowledge about x and y coordinates and potentially z as well (pressure e.g.), speed and direction of possible touches, based for example on the currently running software application. As such, the host may provide corresponding information to an apparatus 40, for energization of the regions/areas of an overall touch surface 12 that are the most beneficial or needed at the moment, e.g., for touch scenarios such as a finger moving slowly, a finger stopped, a finger having a particular trajectory, speed, etc.

For example, the apparatus 40 reads (energizes and processes) only those columns 14 or rows 16 that are included in known or predicted touch areas within the overall touch surface 12. One advantage is predicting the most optimal points for energizing the touch sensor 10 in order to save power. Only parts of the touch surface 12 might be energized for anticipated locations of touches based on the software application that is currently active on the host device 72 that incorporates the touch sensor 10 and the apparatus 40.

Apart from the energy savings, it is recognized herein that energizing only portions of an overall touch surface 12 becomes even more advantageous as such touch areas grow in size and the column/row counts increase. Furthermore, the disclosed techniques extend to advantageous selection of the energization frequencies used to perform partial reads of a touch sensor 10, such as by simplifying the frequency-domain transform operations and/or avoiding frequencies that are associated with noise and interference.

Further, the selective energization of touch-sensor columns 14 and/or rows 16 can be tailored for known or expected input actions, such as swiping, scrolling, predicted movement of a user's finger, a user's pattern of finger usage or movement, the velocity of a finger movement.

There may be relatively simple interaction between the host processing circuitry 70 of a host device 72 and the apparatus 40 that is incorporated into the host device 72 for reading a touch sensor 10 that is also included in the host device 72, or the host processing circuitry 70 may provide the apparatus 40 with relatively rich information. In at least one embodiment, the apparatus 40 receives information that directly or indirectly indicates one or more regions 46 of the overall touch surface 12 of the touch sensor 10 that are to be read in any given partial read performed by the apparatus 40. Such information may identify the specific columns 14 and/or rows 16 to be included in the partial read or may identify coordinates within a reference coordinate system defined by/for the touch surface 12. Further, such information may identify a touch resolution to be used in the identified region(s) 46.

The apparatus 40 uses such information to decide which columns 14 and/or rows 16 to energize in the partial read and it also decides which excitation frequencies to use. The frequencies to be used are selected to reduce the number of Fast Fourier Transform (FFT) points, for example, in the frequency-domain transforms of the combined column and row sensing signals 56 and 66 and to avoid different noise sources that may originate from different parts of the host device 72. Example sources of interference in the host device 72 include its charging system.

The apparatus 40 may also be configured to go to sleep if no touch input is detected within a certain time after beginning a read operation. The host device 72 may also provide the apparatus 40 with indications of mode or operating-system state, or may indicate when the user starts a new software application or when the user switches between software applications, and the apparatus 40 may use such information to decide between full reads, partial reads, or when to perform ongoing reads or go to sleep, or whether certain regions of the overall touch surface 12 must always be active for touch detection, etc.

In an example scenario where the touch sensor 10 is a capacitive touch screen, a single "full read" of the touch sensor 10 requires energizing all column lines 18 and all row lines 28—i.e., all column lines 18 and all row lines 28 undergo capacitive charge/discharge cycling. Advantageously, with a partial read as provided by the apparatus 40, only the particular column lines 18 and row lines 28 that are of interest in the partial read undergo capacitive charging/discharging, with potentially significant power savings thereby realized.

In at least one embodiment of the disclosed apparatus or method, there is an "adaptation" phase used to determine the excitation frequencies to use for a partial read. "Determining" may be determining which frequencies to generate or choosing from among a larger set of predefined frequencies available from a signal generator. In either case, during the adaptation phase, the apparatus 40 performs frequency-domain processing on digital samples of the combined column sensing signal 56 and the combined row sensing signal 66 without applying excitation signals 82 to the columns 14 and rows 16 of the touch sensor 10. Such operations may be regarded as a "dummy read" and they allow the apparatus 40 to detect frequency-specific "interference" in the output column sensing signals 52 and/or the output row sensing signals 64, and thereby adapt (choose) the excitation frequencies used for performing the partial read of the touch sensor 10. Put simply, the adaptation process allows the apparatus 40 to avoid using excitation frequencies that are in or near the frequencies or frequency ranges of detected interference.

As for selecting the subset of excitation frequencies used in a partial read, from among the larger set(s) of excitation frequencies needed for a full read of the touch sensor 10, assume an example scenario where there are ten columns 14 in total, e.g., {C1, C2, . . . , C10}, and that there are ten excitation frequencies used for simultaneous excitation of all columns 14 in a full read. These ten frequencies may be denoted as the set of frequencies {$f\_1 < f\_2 < f\_3$ . . . $f\_9 < f\_10$}.

With the foregoing assumptions, assume that the default mapping of excitation frequencies to columns 14 corresponds to a full read of the touch sensor 10, e.g., f1 to column C1, f2 to column C2, and so on, with f10 used to excite column C10. Now assume that a forthcoming partial read requires excitation of columns C2-C4 and C7-C9. If the apparatus 40 excited those columns 14 using the default mapping of excitation frequencies, the frequency-domain transform for the partial read would have desired information only at the frequency bins corresponding to the excitation frequencies f2-f4 and at the frequency bins corresponding to the excitation frequencies f7-f9.

Consider an example partial read carried out by the apparatus 40 in an example embodiment, or in an example instance. Assume that an identified region 46 that is the target of the partial read involves ten column lines 18. Rather than exciting all ten column lines 18, the apparatus 40 may excite, for example, every other one of the involved column lines 18. While that approach offers lower resolution, the lower resolution may be fine for certain types of touch controls or for certain touch-sensing tasks, in dependence on the running software application, etc. Conversely, if higher resolution is needed, e.g., for "tracking" touch input or otherwise performing gesture detection, the apparatus 40 may excite all or at least a greater number of the column lines 18 that are involved by the touch region 46.

Such resolution control may be provided for the row lines 28, too, either in conjunction with or independent from the column resolution. That is, the touch-detection resolution may be configured for column sensing, or row sensing, or both, and the resolution used for column sensing need not be the same as the resolution used for row sensing during any given partial read. In at least one embodiment, the apparatus 40 is responsive to input signaling, e.g., from host processing circuitry 70, for dynamic control of the column and/or row resolution used for a partial read.

Note, too, that "touch-detection resolution" may depend on two facets of physical resolution—a first facet that depends on whether all involved column lines 18 and/or row lines 28 are excited. This first facet may be referred to as the "sensing-line resolution". A second facet of physical resolution depends on how many excitation frequencies are used to excite multiple involved column lines 18 and/or row lines 28. This second facet may be referred to as the "sensing-frequency resolution". At least one embodiment of the apparatus 40 offers dynamic control of both facets of physical resolution, responsive to explicit or implicit control by the host processing circuitry 70. For example, the apparatus 40 may be configured such that it uses a lowered sensing-line resolution or a lowered sensing-frequency resolution responsive to receiving signaling from the host processing circuitry 70 regarding the operating mode or state of the host software, such as using lowered resolution when the host software is in a locked state where only coarse touch sensing is needed.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of reading a touch sensor, the method comprising:
    identifying a region within a touch surface of the touch sensor to be read;
    performing a partial read of the touch sensor by:
        obtaining touch-control information from a software application running on a host device that includes the touch sensor, the touch-control information identifying the region to be read and indicating a touch-detection resolution to be used for detecting touch inputs to the identified region;
        determining which sensing lines of the touch sensor are involved in the identified region;
        choosing how many of the involved sensing lines to excite as chosen sensing lines, and choosing and how many excitation frequencies to use as chosen excitation frequencies for exciting the chosen sensing lines, in dependence on the touch-detection resolution;
        exciting the chosen sensing lines using the chosen excitation frequencies to obtain a corresponding sensing signal output from each chosen sensing line, and combining the corresponding sensing signals to obtain a combined sensing signal, with unchosen sensing lines of the touch sensor not being excited;
        applying a frequency domain transform to digitized samples of the combined sensing signal, to obtain a sensing value corresponding to each chosen excitation frequency; and
    detecting a touch input to the identified region of the touch surface by evaluating the sensing value corresponding to each chosen excitation frequency.

2. The method of claim 1, further comprising choosing which particular excitation frequencies to use as the chosen excitation frequencies, from a larger set of excitation frequencies, in dependence on a defined selection strategy.

3. The method of claim 2, wherein the defined selection strategy involves choosing the particular excitation frequencies from a defined set of excitation frequencies, in dependence on noise measurements made for respective excitation frequencies in the defined set of excitation frequencies.

4. The method of claim 2, wherein the defined selection strategy involves choosing the particular excitation frequencies from a defined set of excitation frequencies, to minimize the spectral range spanned by the chosen excitation frequencies.

5. The method of claim 1, wherein each sensing line that passes through or bounds the identified region is an involved sensing line with respect to the identified region.

6. The method of claim 5, wherein the identified region comprises two or more regions, each identified region having respectively involved sensing lines.

7. An apparatus configured for reading a touch sensor, the apparatus comprising:
    reading circuitry configured to apply selected excitation frequencies to selected sensing lines of the touch sensor, to generate corresponding sensing signals for detecting touch inputs to a touch surface of the touch sensor; and
    processing circuitry configured to:
        identify a region within the touch surface of the touch sensor to be read; and
        perform a partial read of the touch sensor, based on being configured to:
            obtain touch-control information from a software application running on a host device that includes the touch sensor, the touch-control information identifying the region to be read and indicating a touch-detection resolution to be used for detecting touch inputs to the identified region;
            determine which sensing lines of the touch sensor are involved in the identified region;
            choose how many of the involved sensing lines to excite as chosen sensing lines, and choose how many excitation frequencies to use as chosen excitation frequencies for exciting the chosen sensing lines, in dependence on the touch-detection resolution;
            control the reading circuitry to excite the chosen sensing lines using the chosen excitation frequencies to obtain a corresponding sensing signal output from each chosen sensing line, and combine the corresponding sensing signals to obtain a combined sensing signal, with unchosen sensing lines of the touch sensor not being excited;
            apply a frequency domain transform to digitized samples of the combined sensing signal, to obtain a sensing value corresponding to each chosen excitation frequency; and
            detect a touch input to the identified region of the touch surface by evaluating the sensing value corresponding to each chosen excitation frequency.

8. The apparatus of claim 7, wherein the processing circuitry is configured to choose which particular excitation frequencies to use as the chosen excitation frequencies, from a larger set of excitation frequencies, in dependence on a defined selection strategy.

9. The apparatus of claim 8, wherein the defined selection strategy involves choosing the particular excitation frequencies from a defined set of excitation frequencies, in dependence on noise measurements made for respective excitation frequencies in the defined set of excitation frequencies.

10. The apparatus of claim 8, wherein the defined selection strategy involves choosing the particular excitation frequencies from a defined set of excitation frequencies, to minimize the spectral range spanned by the chosen excitation frequencies.

11. The apparatus of claim 7, wherein each sensing line that passes through or bounds the identified region is an involved sensing line with respect to the identified region.

12. The apparatus of claim 7, wherein the identified region comprises two or more regions, each identified region having respectively involved sensing lines.

13. An electronic device, the electronic device comprising:
- a touch sensor having sensing lines for sensing touch inputs to a touch surface of the touch sensor;
- host processing circuitry configured for execution of one or more software applications that use the touch sensor as a control input; and
- an apparatus configured to interface the host processing circuitry with the touch sensor,
  the apparatus configured to:
   - obtain touch-control information from one or more of the one or more software applications, the touch-control information identifying a region of the touch sensor to be read and indicating a touch-detection resolution to be used for detecting touch inputs to the identified region;
   - determine which sensing lines of the touch sensor are involved in the identified region;
   - choose how many of the involved sensing lines to excite as chosen sensing lines, and choose how many excitation frequencies to use as chosen excitation frequencies for exciting the chosen sensing lines, in dependence on the touch-detection resolution;
   - excite the chosen sensing lines using the chosen excitation frequencies to obtain a corresponding sensing signal output from each chosen sensing line, and combine the corresponding sensing signals to obtain a combined sensing signal, with unchosen sensing lines of the touch sensor not being excited;
   - apply a frequency domain transform to digitized samples of the combined sensing signal, to obtain a sensing value corresponding to each excitation frequency; and
   - detect a touch input to the identified region of the touch surface by evaluating the sensing value corresponding to each chose excitation frequency.

* * * * *